United States Patent [19]

Harigae et al.

[11] 4,368,526

[45] Jan. 11, 1983

[54] SERVO CONTROL SYSTEM FOR OPTICAL SYSTEM WHICH FOCUSES A CONVERGING LIGHT BEAM ON A RECORDING DISC

[75] Inventors: Shunji Harigae, Neyagawa; Tomio Yoshida, Katano; Yoshinobu Nakata; Michiyoshi Nagashima, both of Ikoma; Toshio Sato, Moriguchi, all of Japan

[73] Assignee: Matsushita Electric Industrial Company, Limited, Osaka, Japan

[21] Appl. No.: 229,313

[22] Filed: Dec. 23, 1980

[30] Foreign Application Priority Data

Dec. 28, 1979 [JP] Japan ............... 54-172558

[51] Int. Cl.³ ................................ G11B 7/12
[52] U.S. Cl. ........................ 369/45; 250/201
[58] Field of Search ............... 369/45, 111, 44; 250/201; 318/596

[56] References Cited

U.S. PATENT DOCUMENTS

| | | | |
|---|---|---|---|
| 3,932,700 | 1/1976 | Snopko | 369/45 |
| 3,952,191 | 4/1976 | Linet | 369/45 |
| 4,128,847 | 12/1978 | Roullet | 369/45 |
| 4,280,215 | 7/1981 | Okano | 369/45 |

*Primary Examiner*—Alan Faber
*Attorney, Agent, or Firm*—Lowe, King, Price & Becker

[57] ABSTRACT

A servo control system includes an error amplifier for deriving an error signal representing the displacement of a focus point of laser beam from different planes of an optical record disc, a differentiator for differentiating the error signal to detect its rate of variation, and a comparator for detecting the maximum peak of the differentiated signal which corresponds to reflections from the plane on which information is recorded. The focus point is moved in a direction toward the disc in an open loop mode until the maximum peak of the differentiated signal is detected, whereupon the focus point is controlled in response to the error signal in a closed loop mode to keep track of the recording plane.

8 Claims, 4 Drawing Figures

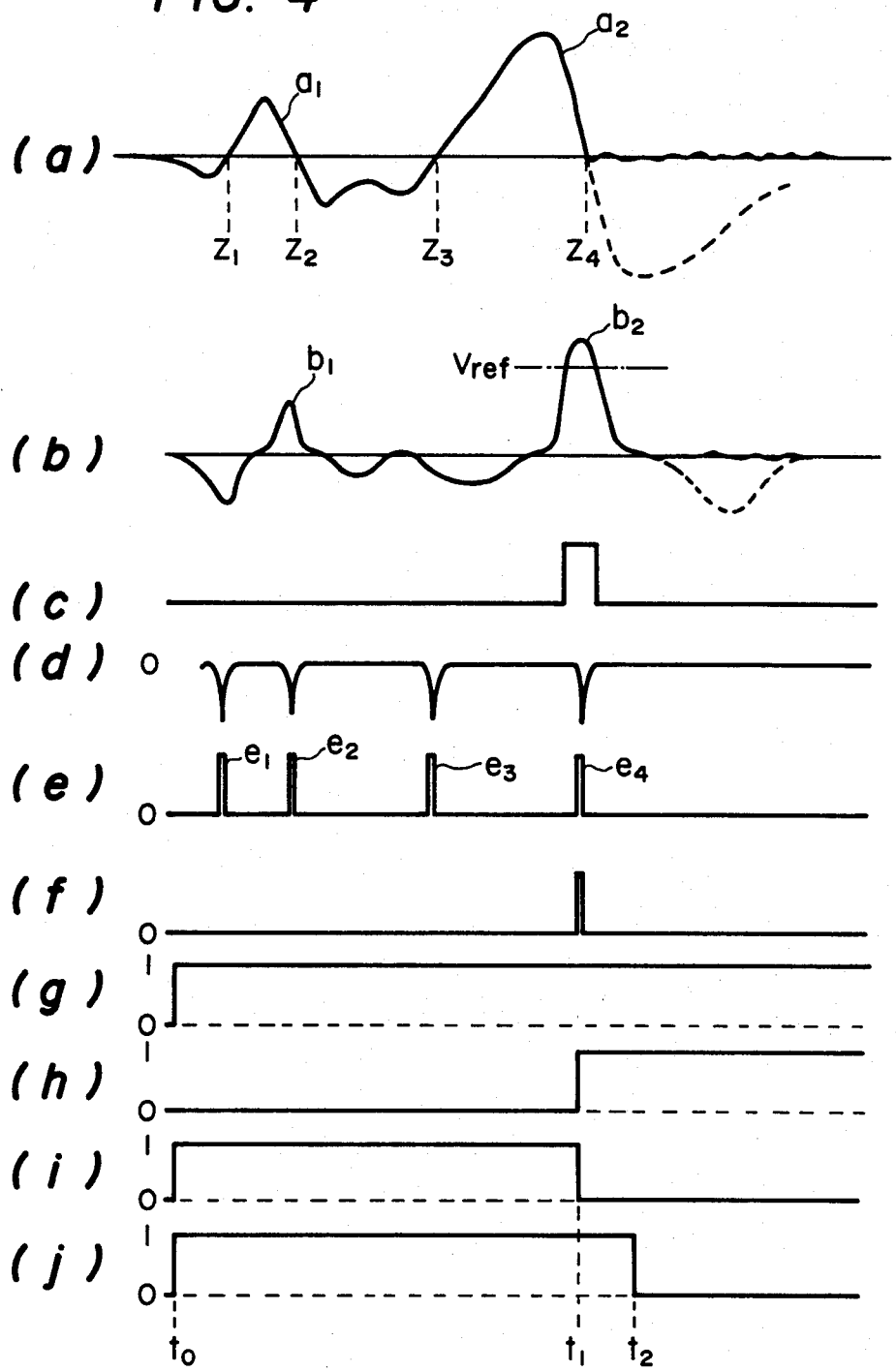

SERVO CONTROL SYSTEM FOR OPTICAL SYSTEM WHICH FOCUSES A CONVERGING LIGHT BEAM ON A RECORDING DISC

BACKGROUND OF THE INVENTION

The present invention relates to servo control systems, and in particular to a servo control system for making a focus point of a laser beam keep track of a plane of a recording disc on which information is recorded. More specifically, the invention is concerned with a novel servo acquisition system whereby the focus point of the beam is moved toward the disc in an open loop mode until the recording plane is detected, whereupon closed loop operation is initiated.

In disc recording systems in which information is recorded in the form of a series of pits along spiral or concentric tracks by the impingement of a laser beam on a light sensitive material, such material is usually sandwiched between two protective layers. The beam impinging side of the protective layers is formed of a transparent material to allow the beam to be focused precisely on the recording plane. Because of reflections from the upper surface of the protective layer, the focus point of the beam would be servo-controlled to the upper surface plane rather than on the recording plane if no appropriate provision is made. Because of the small beam spot size which is usually on the order of 1 micrometer compared to the spacing between the upper surface and the recording plane, the beam focusing on the upper surface is detrimental both to information recording and reading.

In one prior art system, a derived error signal is biased to a DC level sufficient to move the focus point toward the record disc. The speed of the focus point then increases as a result of the error signal which increases in level due to reflections from the disc planes. A speed detector is provided to detect when the focus moving speed reaches a predetermined value which corresponds to the level of reflections from the recording plane. A braking mechanism is provided to initiate application of a brake in response to the moving speed reaching the predetermined value to prevent the focusing lens from hitting the disc surface. The brake is applied until the focus point reaches the recording plane, whereupon the servomechanism comes into play to allow the focus point to keep track of the recording disc which may fluctuate vertically as it revolves with the turntable. Since the braking mechanism is of a precision type, the drive mechanism becomes complicated, resulting in a bulky structure.

SUMMARY OF THE INVENTION

Accordingly, the primary object of the present invention is to provide a servo control system which eliminates the braking mechanism employed in the prior art system.

The servo control system of the invention comprises an open loop circuit that drives a laser beam focusing system in an open loop mode toward the record disc, and a closed loop circuit which responds to the error signal representing the displacement of the focus point from the disc planes. The open loop drive circuit causes the focusing system to advance to allow the laser beam to successively focus on the disc planes, whereby the error signal exhibits first and second successive peaks which occur on one side of a zero crossing level. The closed loop circuit remains disabled during the time when the open loop drive circuit is enabled and includes a detector for detecting a zero crosspoint of the error signal which occurs immediately following the second peak generated in response to the reflections from the recording plane. When this zero crossing point is detected, the open loop drive circuit is disable and the closed loop circuit is enabled to cause the focus point to keep track of the recording plane.

Preferably, the detector comprises a differentiator for sensing the rate of variation of the error signal. Since the reflections from the recording plane have a greater intensity than the intensity of reflections from the upper surface plane, the variation rate of the error signal detected in response to the second peak is greater than that of the signal detected in response to the first peak. The output of the differentiator is at a maximum when the error signal crosses the zero level immediately following the second peak. Since this zero crossing point exactly corresponds to the recording plane, the servo control system is switched from the open loop to the closed loop mode when the differentiator output reaches the maximum value.

BRIEF DESCRIPTION OF THE DRAWINGS

The invention will be further described by way of example with reference to the accompanying drawings, in which:

FIGS. 4a to 4j are illustrations of waveforms in which FIGS. 4a to 4i are associated with the embodiment of FIG. 1 and FIGS. 4a to 4j are associated with the embodiment of FIG. 3.

DETAILED DESCRIPTION

Figure 1:
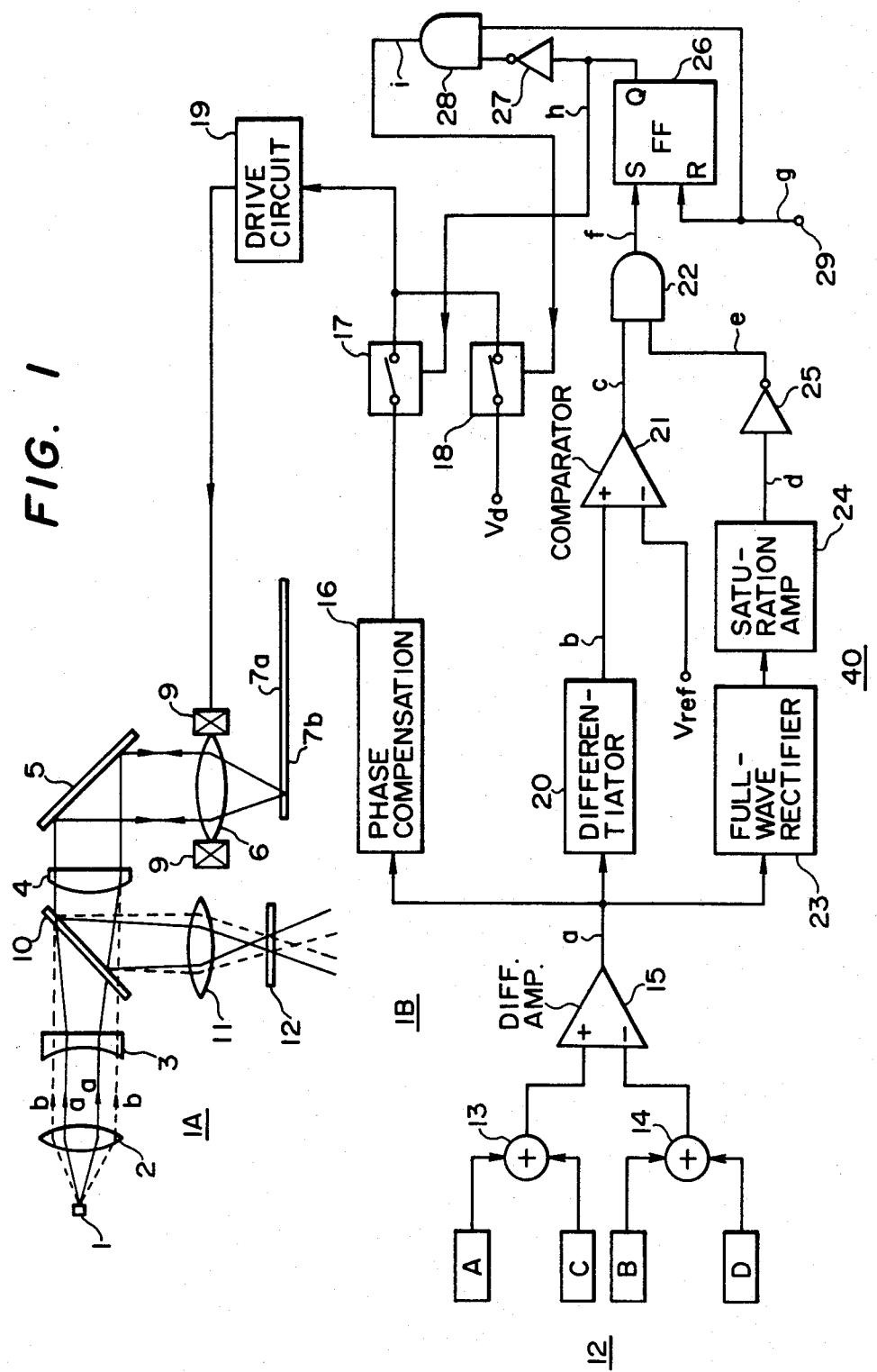
FIG. 1 is an illustration of a first embodiment of the servo control system of the invention.
Figure 2:
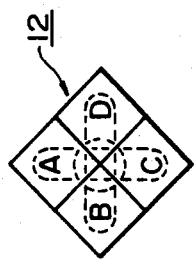
FIG. 2 is an illustration of the light detector of FIG. 1.

Referring now to FIG. 1, a first preferred embodiment of the present invention is illustrated as generally comprising an optical system 1A for focusing a laser beam of a spot size, typically 1 micrometer in diameter, on a transparent recording disc 7, and a servo control system generally designated as 1B. The optical system 1A of the illustrated embodiment is of the type which utilizes the asigmatism of reflected light as a means for deriving an error signal representing the displacement of the focus point of the beam with respect to the recording disc 7. Specifically, the optical system 1A comprises a collimating lens 2 for directing a collimated laser beam emitted from a semiconductor laser 1 toward a reflecting mirror 5 which bends the impinging laser beam toward a converging lens 6. The semiconductor laser 1 is of a rectangular configuration and the rectangular cross-section of the emitted laser is transformed into a circular cross-section by means of a set of a plano-convex lens 3 and a plano-concave lens 4. Between the lenses 3 and 4 is located a beam splitter 10 which passes the laser light from source 1 to the mirror 5 while reflecting the beam which returns from the disc 7 through lenses 6 and 4 toward a light detector 12 via a converging lens 11. The laser beam components indicated by solid lines a propagate through the central region of the lens system so that it has a higher focusing effect on such components than it has on the components indicated by broken lines b. The lenses 4 and 11 coact with each other to provide astigmatism to the reflected laser light. This results in a beam spot of a circular shape on the light detector 12 when the beam is precisely focused on the disc 7. The configuration of the beam spot on the detector 12 becomes elongated in a direction determined by the direction of displacement of the focus point with respect to the disc. As illustrated in FIG. 2, the light detector 12 is made up of four segments of light sensitive material designated as A, B C and D which are arranged in an orthogonal relationship. When a circular section beam is focused on the detector 12, equal amounts of electrical signal are developed in these detector segments and if the impinging beam spot is elongated detector segments B and D generate equal amounts of signal, while no signals are developed in the other segments. If the direction of displacement is opposite, the detector segments A and C generate signals, while the other segments provide no signals.

The converging lens 6 is mounted on a driving mechanism 9 schematically illustrated as comprising a ring coil which is energized with a current supplied from the servo control system 1B to move the converging lens 6 toward the disc 7 or away from it. The recording disc 7 has a transparent protection layer having an upper surface 7a facing toward the converging lens 6 and a lower surface 7b on which a layer of light sensitive recording material is coated. The disc 7 includes an underlying protection layer (not shown) so that the recording material is sandwiched between two layers and is mounted on a turntable (not shown).

The signals developed in the light detector segments A and C are arithmetically combined in an adder 13, while those from the segments B and D are arithmetically combined in an adder 14. The outputs of the adders 13 and 14 are supplied respectively to the noninverting and inverting inputs of an error detecting differential amplifier 15. The servo control system 1B includes a phase compensation circuit 16 which applies a phase-compensated error signal to a drive circuit 19 via a closed loop mode switch 17, when closed, to supply the driving mechanism 9 with a feedback control signal when the servo control system 1B operates in a closed loop mode. The drive circuit 19 is also supplied with a drive signal Vd from a voltage source, not shown, via an open-loop mode switch 18 when the system operates in an open loop mode. If the drive mechanism 9 includes a biasing system which urges its moving part in a direction away from the disc by means of a return spring, the drive signal Vd increases in amplitude as a function of time to balance against the increasing spring action as the drive mechanism 9 is moving toward the disc 7. If the drive mechanism 9 employs a linear motor or the like wherein its moving part is driven with a constant force, the drive signal Vd is a D.C. voltage of constant value.

In accordance with the invention, the servo control system 1B includes a differentiator 20 connected to the output of the error amplifier 15. The output of the comparator 20 is connected to the noninverting input of a comparator 21 in which the input signal is compared with a reference voltage Vref. The output of the differentiator 20 varies as a function of the rate of variation in voltage of the error signal, so that if the rate of voltage variation is greater than a specified value represented by the reference voltage Vref, the output of the comparator 21 is driven to a high voltage level. The output of the comparator 21 is coupled to a coincidence gate 22 to serve as an enable or open-gate signal for applying a pulse generated by a zero crossing detector designated generally as 40 to the set input of a flip-flop 26. The zero crossing detector 40 comprises a full-wave rectifier 23 connected to the output of the error amplifier 15 to provide a full-wave rectified error signal to a saturation amplifier 24 where the rectified signal is amplified to a saturation level. An inverter 25 is connected to the output of the saturation amplifier 24 to generate a train of positive going pulses which occur in correspondence with the zero crossing points of the error signal.

The Q output of the flip-flop 26 is connected to the control terminal of the closed-loop control switch 17 to close its contacts to initiate closed-loop operation, and is also connected via an inverter 27 to a coincidence gate 28 which receives as its other input from a control terminal 29 connected to the reset input of the flip-flop 26. The output of the coincidence gate 28 is coupled to the control terminal of the open-loop control switch 18.

The operation of the embodiment of FIG. 1 will now be explained with reference to the waveforms shown in FIG. 4 in which reference characters on the left side correspond to the signals marked with the same characters in FIG. 1. A high level signal "g" is applied to the terminal 29 to reset the flip-flop 26 and cause the AND gate 28 to generate a high level signal "i" since the Q output of flip-flop 26 is initially at low voltage level and the latter is inverted by the inverter 27. The open-loop switch 18 is thus closed and the drive signal Vd is applied through drive circuit 19 to the drive mechanism 9 so that the converging lens 6 is moved in the open loop mode toward the recording disc 7. When the focus point of the converging beam approaches the upper surface plane 7a of disc 7, the error signal "a" derived at the output of the differential amplifier 15 remains at a zero voltage level until the focus point reaches a point immediately above the surface 7a, whereupon the error signal swings to the negative side and then crosses the first zero voltage point $Z_1$ to swing to the positive side producing a positive peak $a_1$. The error signal then swings toward the negative side intersecting the second zero crossing point $Z_2$ when the focus point exaclty falls on the upper surface 7a. A further movement of the focus point toward the lower, recording surface 7b causes the error signal "a" to intersect the third zero crossing point $Z_3$ to swing to the positive side until it intersects the fourth zero crossing point $Z_4$ producing a second positive peak $a_2$. The fourth zero crossing point $Z_4$ is known to occur at the instant the focus point exactly falls on the recording surface 7b.

It is seen in FIG. 4a that the second peak $a_2$ has a higher peak value than the first peak $a_1$ and that the second peak $a_2$ has a higher rate of variation as it falls toward the zero level than the rate of variation of the first peak $a_1$ as the latter falls toward the zero level.

The differentiator 20 thus produces an output "b" having a first positive peak $b_1$ corresponding to the second zero crossing point $Z_1$ of error signal "a" and a second positive peak $b_2$ corresponding to the fourth zero crossing point $Z_4$. To discriminate between the two positive peaks $b_1$ and $b_2$, the reference voltage Vref of the comparator 21 is selected at a value which falls between the peak values of the positive peaks $b_1$ and $b_2$, as shown in FIG. 4b. Thus, the comparator 21 generates a positive pulse "c" which is applied to the coincidence, or AND gate 22 to open its gate. The waveform "d" is an output of the saturation amplifier 24 to which the full-wave rectified error signal is applied for amplification to the level of saturation. As shown, the waveform "d" is a train of negative going spikes which occur in correspondence with the zero crossing points $Z_1$ to $Z_4$, respectively. These negative going spikes are converted by the inverter 25 into a train of positive going pulses $e_1$, $e_2$, $e_3$ and $e_4$. The #4 pulse $e_4$ is gated through the coincidence gate 22 producing a pulse "f" which sets the flip-flop 26. The Q output "h" of flip-flop 26 now switches to a high voltage level and the output signal "i" of AND gate 28 now switches to a low voltage level to open the contacts of switch 18. The high level signal "h" is applied to the closed loop control switch 17 to change the operating state of the drive mechanism 9 from the open loop mode to the closed loop mode. Once the system is switched to the closed loop operation, the error signal comes into play so that the converging lens 6 keeps track of the lower surface 7b. Since the closed loop operation commences at a point where the amplitude of the error signal is at or near the zero voltage level, there is no tendency in the driving mechanism 9 toward being driven excessively past the desired point, thereby eliminating the need for a breaking mechanism.

The operating parameters of the servo control system, such as the power level of the laser 1, the reflection coefficient of the disc 7 and the aging factor of the optical system 1A, may vary as a function of time to affect on the voltage level of the error signal. However, because of the use of the differentiator 20 as a means for detecting the rate of variation of peaks $a_1$ and $a_2$ for the purpose of their discrimination and since the variation rate is invariable in respect of such varying operating parameters, the present invention assures precision in keeping track of the surface 7b regardless of the varying operating parameters.

In the case of the driving mechanism having a return spring, such return springs may have a different spring tension which may deviate from those of other servo systems. The drive voltage Vd must be adjusted to meet the different spring tension and such adjustment is required for each system. Furthermore, if the surface of disc 7 fluctuates vertically in a wide range because of surface irregularities, the drive signal Vd of a substantial magnitude would be required to accommodate such deviation factors. If the drive voltage of a large amplitude is rapidly cut off when the system enters the closed loop mode, the return spring tension would overcome the force generated by the error signal so that the drive mechanism 9 would be moved in a direction away from the record disc 7 and the converging lens 6 becomes out of control of the servo control system 1B. It is thus preferable that the focus servo control system have a safety margin in respect of phase compensation and loop gain sufficient to assure smooth transition from the open loop mode to the closed loop mode.

Figure 3:
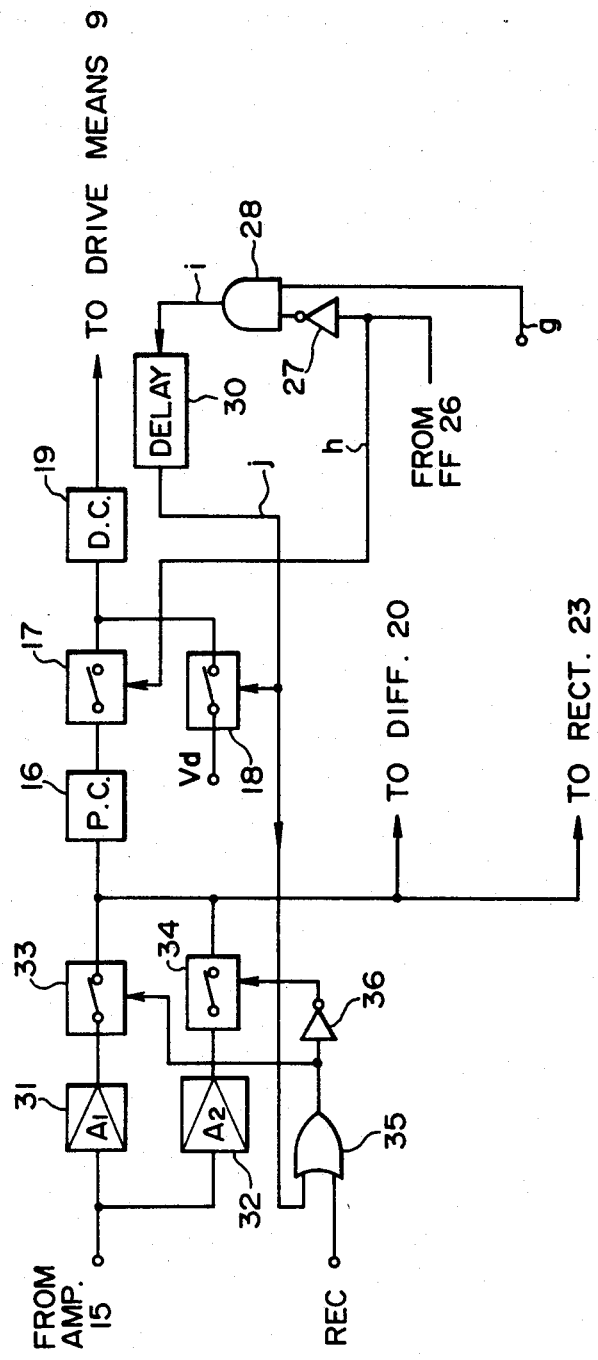
FIG. 3 is an illustration of a second embodiment of the present invention.

The above problem is eliminated by simultaneously applying the drive signal Vd and the error signal "a" to the drive mechanism 9 for a certain period of time while reducing the loop gain of the closed loop control below normal level when the system enters the closed loop mode. A second embodiment of the invention, illustrated in FIG. 3, includes this smooth transition feature. In FIG. 3, parts which correspond to those of FIG. 1 are marked with the same reference numerals as in FIG. 1, the parts having corresponding reference numerals having corresponding significance. The system includes amplifiers 31 and 32 having their inputs connected together to the output of the error amplifier 15 and having their outputs connected respectively via switches 33 and 34 to the input of phase compensator 16. A delay circuit 30 is connected to the output of the AND gate 28 to stretch the trailing edge of the output "i" of AND gate 28 for a certain interval, the time-stretched output "j" being coupled to the open-loop control switch 18 and to an OR gate 35. The output of OR gate 35 is connected to the control terminal of switch 33 and also to the control terminal of switch 34 via an inverter 36, so that one of switches 33 and 34 is operated exclusively of the other in response to an output from the OR gate 35. The amplifier 31 has a smaller amplification gain than the amplifier 32. A recording mode signal is also applied to the OR gate 35 to close the contacts of switch 33 to amplify the error signal of the recording mode at a gain which is reduced by an amount sufficient to compensate for the higher light intensity of the laser beam used to record information than is used to sense the recorded information.

The operation of the system of FIG. 3 is generally similar to that described in connection with FIG. 1 with the exception as follows. During the time when the system is operating in the open loop mode, the signal "j" from the delay circuit 30 is at a high voltage level as seen in FIG. 4j so that the switch 33 is closed during the time prior to the system entering the closed loop mode. When the system enters the closed loop mode in response to the signal "h" from the Q output of flip-flop 26, the open loop control switch 18 remains in the closed position to continue application of the drive signal Vd until the delay period provided by the delay circuit 30 terminates. Therefore, the switch 33 remains closed during this delay interval and the loop gain of the closed loop operation is initially at a low value and subsequently at the termination of the delay interval the switch 33 is open and switch 34 is closed to increase the loop gain to a higher value. With the error signal being applied through the smaller gain amplifier 31, the switch 18 remains closed to apply the drive signal Vd simultaneously to the drive mechanism 9 until the loop gain is switched to the higher level.

Normal servo control operation thus commences immediately following the termination of the delay interval with a higher loop gain to keep track of the recording surface 7b. It is preferable that in order for the servo control system to ensure a further stability during the transitory period the amplifier 31 have a smaller gain in the lower frequency range of the spectrum of the control system than in the higher frequency range.

What is claimed is:
1. A servo control system for an optical system which focuses a converging light beam on a recording disc having a layer of transparent material with a first plane facing toward said beam and a second plane spaced from said first plane, wherein information is recorded on said second plane, comprising:
 first means for detecting light reflected from said first or second plane;
 second means for deriving from said detected light an error signal representing the displacement of the focus point of said light beam from either one of said first and second planes;
 a driving mechanism for moving said optical system in a direction toward said disc, whereby said error signal includes first and second successive peaks which occur on one side of a zero crossing level when said converging light beam is made to focus successively on said first and second planes;

third means for detecting when said error signal reaches a point substantially at or near the zero crossing point which occurs immediately following said second peak; and fourth means for operating said driving mechanism in an open loop mode to cause said optical system to move toward said disc until the time said zero crossing point is detected and subsequently operating said driving mechanism in a closed loop mode in accordance with said error signal to allow said converging beam to focus on said second plane.

2. A servo control system as claimed in claim 1, wherein said third means comprises:
means for detecting the time-varying rate of said error signal; and
means for detecting a maximum value of said detected rate.

3. A servo control system as claimed in claim 2, wherein said time-varying rate detecting means comprises a differentiator.

4. A servo control system as claimed in claim 2, wherein said maximum value detecting means comprises:
a comparator for generating an output when said detected time-varying rate is greater than a reference value;
a zero crossing detector for generating an output whenever said error signal crosses said zero level; and
a coincidence gate connected to the outputs of said comparator and said zero crossing detector to generate a coincidence output for application to said fourth means to cause the operating state of said driving mechanism to switch from said open loop mode to said closed loop mode.

5. A servo control system as claimed in claim 1, wherein said third means comprises:
means for successively detecting said first and second peaks; and
means for detecting the instant when the trailing edge of said second peak reaches a point substantially at or near said zero level.

6. A servo control system as claimed in claim 1, 2, 3, 4 or 5, wherein said fourth means comprises switching means for selectively applying a drive signal to said driving mechanism for moving said optical system toward said disc until the time said zero crossing point is detected or applying said error signal to said driving mechanism for maintaining said optical system in a controlled position with respect to said second plane in response to said zero crossing point being detected, and means for introducing a delay to said drive signal so that said drive signal and said error signal are simultaneously applied to said driving mechanism during the delay interval.

7. A servo control system as claimed in claim 6, wherein the closed loop gain of said servo control system during said delay interval is lower than the closed loop gain which exists during the time which follows said delay interval.

8. A servo control system as claimed in claim 6, wherein the lower frequency closed loop gain of said servo control system during said delay interval is lower than the lower frequency closed loop gain which exists during the time which follows said delay interval.

* * * * *